UNITED STATES PATENT OFFICE.

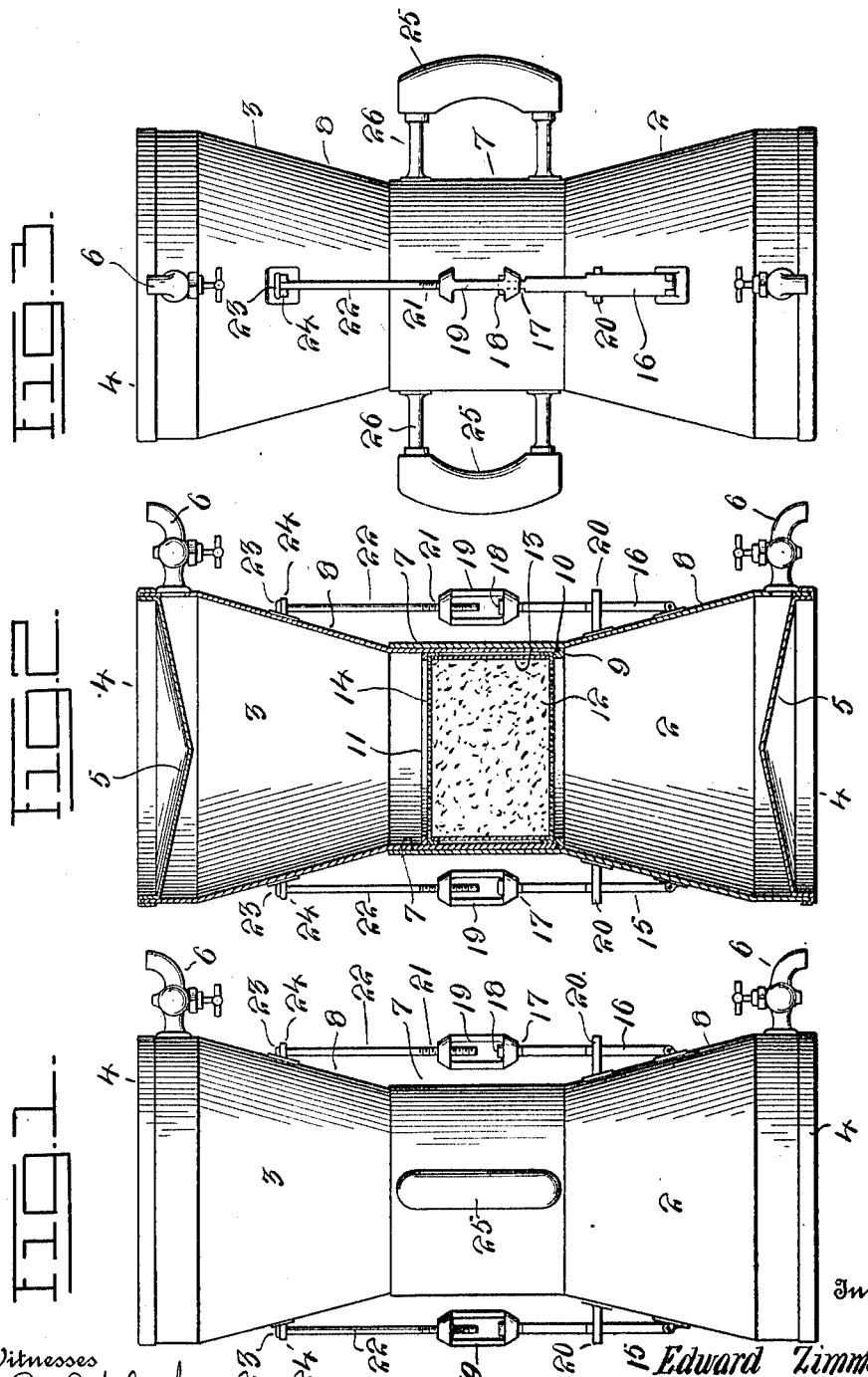

EDWARD ZIMMERMAN, OF KANSAS CITY, MISSOURI.

REVERSIBLE COFFEE-POT.

1,001,496.　　　　　Specification of Letters Patent.　　Patented Aug. 22, 1911.

Application filed October 22, 1910. Serial No. 588,468.

*To all whom it may concern:*

Be it known that I, EDWARD ZIMMERMAN, a citizen of the United States, residing at Kansas City, in the county of Jackson and State of Missouri, have invented new and useful Improvements in Reversible Coffee-Pots, of which the following is a specification.

This invention relates to improvements in apparatus for making coffee, and the object of the invention is to provide a device whereby coffee may be made of any desired strength without losing any of its aroma, and comprises a pair of detachable members between which is positioned a perforated container adapted to receive the ground or pulverized coffee, the device being reversible so that the coffee can circulate through the container from one compartment to the other.

With the above, and other objects in view, which will appear as the description progresses, the invention resides in the novel construction and combination of parts hereinafter fully described and claimed.

In the accompanying drawings, Figure 1 is a side elevation of the device. Fig. 2 is a vertical transverse sectional view of the device constructed in accordance with the present invention. Fig. 3 is a similar view taken at right angles to Fig. 1.

In the accompanying drawings the numeral 1 designates the improved coffee making apparatus. This apparatus 1 comprises essentially a pair of sections or vessels 2 and 3. The vessel 3 is adapted to have its open mouth inserted within the open mouth of the vessel 2. The apparatus is adapted to be reversible so that either of the vessels may be positioned upon a flame such as is provided by an ordinary alcohol lamp and whereby the coffee may be brewed upon the table where it is adapted to be served. The bodies of the members 2 and 3 are substantially similar and the description referring to one may be understood as referring to the second. Each of the vessels 2 and 3 has its closed end provided with a rim 4 and the bottom of each of the said vessels is flared from its center and terminates at a point adjacent the top of the rim 4. By constructing the bottom 5 in this manner it will be noted that the flame from the lamp is directed to the center of the said bottom and at the same time the coffee percolated from the container, hereinafter to be described and may have free passage through an outlet faucet 6 which is positioned upon one side of the vessel adjacent the lower portion thereof. Each of the vessels 2 and 3 has what may be termed its body portion cone-shaped as clearly illustrated in the several figures of the drawing and projecting from said cone-shaped portion is a reduced annular extension 7. The extension 7 of the vessel 3 is of a slightly lesser diameter than that of the vessel 2 so that the said extension may snugly fit within the extension of the said vessel 2. The vessel 3 is provided at the juncture of the annular flange or extension 7 and the cone-shaped body 8 with a flanged ring 9. This ring 9 is adapted to receive a washer 10 constructed of cork or other suitable substance which will not affect the taste of the coffee and which at the same time forms a secure bearing for the end of the flange 7 of the member 3 to prevent the escape of the aroma from the coffee or the leakage of the brewed coffee when the vessels are reversed or upset. The annular flange 7 of the vessel 3 is provided with an annular band 11, and positioned between the flanged ring 9 and the band 11 is a coffee container 12. This container 12 comprises an annular body portion 13 having both its top and its bottom perforated as at 14. Either the top or the bottom of the container 12 is removably connected with the body 13, so that access to the interior of the container may be obtained when it is desired to fill the container with coffee, or to remove the grounds therefrom after the substance of the said coffee has been extracted.

Hingedly connected to the opposite sides of the body 8 of the vessel 2 is a pair of arms 15 and 16, both of which are provided with a reduced extension 17 terminating in a ball-shaped head 18. This head 18 is preferably removably connected with the reduced extension 17 and positioned between the said head and the shoulder provided by the portion 17 is a turn buckle 19. The body 8 of the vessel 2 is further provided upon each of its sides with a pair of outwardly extending arms 20, the latter being adapted to engage the hinged members 15 and 16 so as to prevent lateral movement of the same when the device is in the position illustrated in the figures of the drawing. The upper portion of the turn buckle 19 adjacent its connection with the head 18 is threaded and the said threads are adapted to co-act with the male threads 21 provided upon a rod 22. The rod 22 has its free end provided with an off-set head 23 and the body of the vessel 3 is formed with spaced lugs 24 between which the head of the rod 22 is adapted to rest. By this arrangement, it will be noted that the turn buckle 19 will effectively and securely connect the members 2 and 3 together and force the edges of the flange 7 of the member 3 tightly into contact with the washer 10 provided upon the flanged ring 9 of the vessel 2.

In order to provide for the handling of the coffe pot without danger of injury to the hands of the operator, the flanged extension 7 of the vessel 2 is provided with suitable handles 25. These handles 25 are arranged diametrically opposite and at substantially right angles to the turn buckles or securing members for the vessels. The handles 25 are formed with longitudinally extending arms 26, whereby the handles proper are positioned a distance away from the vessels.

It will be noted that the uppermost offset of the pot is to have its valve open so that the same may be employed as an air and steam vent. The extending arms 20 are preferably closed across their ends to form what may be termed a staple which is adapted to prevent the hinged members 15 and 16 from dropping down when the pot is opened.

Having thus fully described the invention, what I claim as new is:—

In a reversible coffee pot, the combination including a pair of vessels, each of said vessels having a conical body and a reduced annular extension, one of said extensions adapted to be fitted snugly within the other of said annular extensions, annular flanges being formed on the inner surface of said extensions and adjacent the inner ends thereof, one of said flanges being substantially L-shaped whereby to form an annular groove for the reception of the adjacent edge of the inner extension, a container adapted to be received between the flanges, and means for removably connecting the vessels together, said means comprising rods, turn buckles for connecting the rods, each of the said vessels being provided with ears, said ears being adapted for the reception of the outer ends of the rods.

In testimony whereof I affix my signature in presence of two witnesses.

EDWARD ZIMMERMAN.

Witnesses:
Z. EDMOND DAVIDSON,
GEORGE A. AVERILL.

---

Copies of this patent may be obtained for five cents each, by addressing the "Commissioner of Patents, Washington, D. C."